United States Patent
Shen

(10) Patent No.: US 11,184,370 B1
(45) Date of Patent: Nov. 23, 2021

(54) IDENTIFYING AND PROTECTING AGAINST EVOLVING CYBERATTACKS USING TEMPORAL WORD EMBEDDINGS

(71) Applicant: SYMANTEC CORPORATION, Mountain View, CA (US)

(72) Inventor: Yun Shen, Bristol (GB)

(73) Assignee: NORTONLIFELOCK INC., Tempe, AZ (US)

( * ) Notice: Subject to any disclaimer, the term of this patent is extended or adjusted under 35 U.S.C. 154(b) by 296 days.

(21) Appl. No.: 16/526,642

(22) Filed: Jul. 30, 2019

(51) Int. Cl.
    *H04L 29/06* (2006.01)
(52) U.S. Cl.
    CPC .......... *H04L 63/1416* (2013.01); *H04L 63/10* (2013.01); *H04L 63/1433* (2013.01); *H04L 63/1441* (2013.01)
(58) Field of Classification Search
    None
    See application file for complete search history.

(56) References Cited

U.S. PATENT DOCUMENTS

| | | | | |
|---|---|---|---|---|
| 11,025,649 | B1* | 6/2021 | Bilge | G06N 20/00 |
| 2018/0219895 | A1* | 8/2018 | Silver | H04L 41/147 |
| 2018/0336436 | A1* | 11/2018 | Cheng | G06K 9/00523 |
| 2019/0182285 | A1* | 6/2019 | Bagheri | G06F 9/44 |
| 2019/0318085 | A1* | 10/2019 | Mathur | G06F 21/554 |
| 2020/0193305 | A1* | 6/2020 | Braunstein | G06K 9/00463 |
| 2020/0322368 | A1* | 10/2020 | Cohen | H04L 63/1416 |

OTHER PUBLICATIONS

Nigam, Ruchina; "Unit 42—Multi-exploit IoT/Linux Botnets Mirai and Gafgyt Target Apache Struts, SonicWall"; Webpage; located at: https://unit42.paloaltonetworks.com/unit42-multi-exploit-iotlinux-botnets-mirai-gafgyt-target-apache-struts-sonicwall/Sep. 9, 2018; 11 pages.

Aminikhanghahi et al.; "A Survey of Methods for Time Series Change Point Detection"; School of Electrical Engineering and Computer Science, Washington State University; 2016; 23 pages.

Antonakakis et al.; "Understanding the Mirai Botnet"; Conference paper; Presented at the 26th USENIX Security Symposium Aug. 16, 2017; 19 pages.

(Continued)

*Primary Examiner* — Christopher C Harris
(74) *Attorney, Agent, or Firm* — Maschoff Brennan

(57) ABSTRACT

Identifying and protecting against evolving cyberattacks using temporal word embeddings. In some embodiments, a method may include identifying sequences of security events that occurred over time on endpoint devices. The method may also include embedding each of the sequences of security events into low dimensional vectors, such that each of the sequences of security events is treated as a sentence, and such that each of the security events is treated as a word in the corresponding sentence. The method may further include analyzing the low dimensional vectors to identify a first cyberattack represented by a first sequence of security events and a second cyberattack represented by a second sequence of security events that is different from the first sequence of security events, the second cyberattack being an evolved version of the first cyberattack. The method may also include, in response to identifying the second cyberattack, protecting against the second cyberattack.

20 Claims, 5 Drawing Sheets

(56) References Cited

OTHER PUBLICATIONS

Bilge et al.; "Disclosure: Detecting Botnet Command and Control Servers Through Large-Scale NetFlow Analysis"; Conference paper; Presented at: Proceedings of the 28th Annual Computer Security Applications Conference; Dec. 2012; 10 pages.
Bilge et al.; "Before We Knew It: An Empirical Study of Zero-Day Attacks In The Real World"; Conference paper; Presented at: CCS'12, Raleigh, North Carolina; Oct. 16-18, 2012; 12 pages.
Bozorgi et al.; "Beyond Heuristics: Learning to Classify Vulnerabilities and Predict Exploits"; Department of Computer Science and Engineering, University of California; Conference paper; Presented at: KDD'10; Jul. 25, 2010, Washington D.C.; 9 pages.
Cuppens et al.; "Alert Correlation in a Cooperative Intrusion Detection Framework"; Conference paper; Presented at: Proceedings 2002 IEEE Symposium on Security and Privacy; May 12-15, 2002; 14 pages.
Dhingra et al.; "Tweet2Vec: Character-Based Distributed Representations for Social Media"; Conference paper; Presented at Proceedings of the 54th Annual Meeting of the Association for Computational Linguistics; Aug. 7-12, 2016; 6 pages.
Ding et al.; "Asm2Vec: Boosting Static Representation Robustness for Binary Clone Search against Code Obfuscation and Compiler Optimization"; Conference paper; Presented at 40th IEEE Symposium on Security and Privacy; May 20-22, 2019, San Francisco, CA; 18 pages.
Farinholt et al.; "To Catch a Ratter: Monitoring the Behavior of Amateur DarkComet RAT Operators in the Wild"; Conference paper; Presented at: 2017 IEEE Symposium on Security and Privacy (SP); May 22-26, 2017, San Jose, CA; 18 pages.
Appache Software Foundation; "Media Alert: The Apache Software Foundation Confirms Equifax Data Breach Due to Failure to Install Patches Provided for Apache Struts Exploit"; Blog located at: https://blogs.apache.org/foundation/entry/media-alert-the-apache-software; Sep. 14, 2017; 2 pages.
Grier et al.; "Manufacturing Compromise: The Emergence of Exploit-as-a-Service"; Conference paper; Presented at CCS'12, Raleigh, North Carolina; Oct. 16-18, 2012; 12 pages.
Gu et al.; "BotMiner: Clustering Analysis of Network Traffic for Protocol- and Structure-Independent Botnet Detection"; Conference paper; Presented at 17th USENIX Security Symposium, San Jose, CA; Jul. 28-Aug. 1, 2008; 16 pages.
Gu et al.; "BotHunter: Detecting Malware Infection Through IDS-Driven Dialog Correlation"; Conference paper; Presented at 16th USENIX Security Symposium, Boston MA; Aug. 6-10, 2017; 16 pages.
Hassan et al.; "NODOZE: Combatting Threat Alert Fatigue with Automated Provenance Triage"; Conference paper; Presented at Network and Distributed Systems Security (NDSS) Symposium 2019, San Diego, CA; Feb. 24-27, 2019; 15 pages.
Hutchins et al.; "Intelligence-Driven Computer Network Defense Informed by Analysis of Adversary Campaigns and Intrusion Kill Chains"; White paper; located at: https://www.lockheedmartin.com/content/dam/lockheed-martin/rms/documents/cyber/LM-White-Paper-Intel-Driven-Defense.pdf; Jan. 2011; 14 pages.
Janakiraman et al.; "Indra: A peer-to-peer approach to network intrusion detection and prevention"; Conference paper;12th IEEE International Workshops on Enabling Technologies: Infrastructure for Collaborative Enterprises; Jul. 2003; 6 pages.
Jordaney et al.; "Transcend: Detecting Concept Drift in Malware Classification Models"; Conference paper; Presented in USENIX Security Symposium 2017, Vancouver, BC, Canada; Aug. 16-18, 2017; 20 pages.
Trivedi et al.; "Distributed Intrusion Detection System using Mobile Agents"; Conference paper; Presented at 2009 International Symposium on Computing, Communication and Control 2009, Tianjin, China; Oct. 17-19, 2009; 5 pages.

Kantchelian et al.; "Approaches to Adversarial Drift"; Conference paper; Presented at AISec'13, Berlin, Germany; Nov. 4, 2013; 11 pages.
Kwon et al.; "Catching Worms, Trojan Horses and Pups: Unsupervised Detection of Silent Delivery Campaigns"; Conference paper Presented at NDSS, 2017; 18 pages.
Levy et al.; "Neural Word Embedding as Implicit Matrix Factorization"; Published in Neural Information Processing Systems (NIPS) 2014; 9 pages.
Li et al.; "Data Poisoning Attacks on Factorization-Based Collaborative Filtering"; Conference paper; Presented at 29th Conference on Neural Information Processing Systems (NIPS) 2016, Barcelona, Spain; 13 pages.
Li et al.; "A Large-Scale Empirical Study of Security Patches"; Conference paper; Presented at CCS'17, Dallas, TX; Oct. 30-Nov. 1, 2017; 15 pages.
Li et al.; "Word Embedding Revisited: A New Representation Learning and Explicit Matrix Factorization Perspective"; Conference paper; Presented in IJCAI'15 Proceedings of the 24th International Conference on Artificial Intelligence, Buenos Aires, Argentina; Jul. 25-31, 2015; 7 pages.
Liu et al.; "CLoudy with a Chance of Breach: Forecasting Cyber Security Incidents"; Conference paper; Presented at 24th USENIX Security Symposium, Washington D.C.; Aug. 12-15, 2015; 17 pages.
Maggi et al.; "Protecting a Moving Target: Addressing Web Application Concept Drift"; Conference paper; Presented at: Recent Advances in Intrusion Detection: 12th International Symposium, Saint-Malo, France; Sep. 23-25, 2009; 20 pages.
Manzoor et al.; "Fast Memory-efficient Anomaly Detection in Streaming Heterogeneous Graphs"; Conference paper; Presented in KDD'16, San Francisco, CA; Aug. 13-17, 2016; 10 pages.
Mezzour et al.; "Longitudinal Analysis of a Large Corpus of Cyber Threat Descriptions"; Journal of Computer Virology and Hacking Techniques; Jun. 2014; 12 pages.
Mikolov et al.; "Distributed Representations of Words and Phrases and their Compositionality"; Conference paper; Presented at Neural Information Processing Systems (NIPS) 2013; Oct. 16, 2013; 9 pages.
Milajerdi et al.; "HOLMES: Real-time APT Detection through Correlation of Suspicious Information Flows"; Published in: ArXiv abs/1810.01594 (2018); Oct. 20, 2018; 16 pages.
Nappa et al.; "The Attack of the Clones: A Study of the Impact of Shared Code on Vulnerability Patching"; Conference paper presented at: 2015 IEEE Symposium on Security and Privacy, San Jose, CA; May 17-21, 2015; 17 pages.
Nayak et al.; "Some Vulnerabilities Are Different Than Others—Studying Vulnerabilities and Attack Surfaces in the Wild"; RAID (2014); 21 pages.
Pei et al.; "HERCULE: Attack Story Reconstruction via Community Discovery on Correlated Log Graph"; Conference paper; presented at: ACSAC'16, Los Angeles, CA; Dec. 5-9, 2016; 13 pages.
Pennington et al.; "GloVe: Global Vectors for Word Representation"; Conference paper; presented at: Proceedings of the 2014 Conference on Empirical Methods in Natural Language Processing (EMNLP); Jan. 2014; 12 pages.
Provos et al.; "Preventing Privilege Escalation"; Conference paper; USENIX conference, Sep. 2003; 11 pages.
Rapp, Reinhard; "Word Sense Discovery Based on Sense Descriptor Dissimilarity"; 2019; 8 pages.
Rid et al.; "Attributing Cyber Attacks"; Jun. 9, 2014; Published in Journal of Strategic Studies, 2015; vol. 38, Nos. 1-2, 4-37; 34 pages.
Sabottke et al.; "Vulnerability Disclosure in the Age of Social Media: Exploiting Twitter for Predicting Real-World Exploits" Conference paper; Presented in SEC'15 Proceedings of the 24th USENIX Conference on Security Symposium, Washington D.C. Aug. 12-14, 2015;16 pages.
Shen et al.; "TIRESIAS: Predicting Security Events Through Deep Learning"; Conference paper; Presented at CCS'18, Toronto, Canada Oct. 15-19, 2018; 14 pages.
Sommer et al.; Outside the Closed World: On Using Machine Learning For Network Intrusion Detection; Conference paper Pre-

(56) References Cited

OTHER PUBLICATIONS sented at: Proceedings of the IEEE Symposium on Security and Privacy 2010, Oakland, California; 2010; 12 pages.

Song et al.; "DEEPMEM: Learning Graph Neural Network Models for Fast and Robust Memory Forensic Analysis"; Conference paper Presented at CCS'18, Toronto, Canada; Oct. 15-19, 2018; 13 pages.

Tavabi et al.; "DarkEmbed: Exploit Prediction with Neural Language Models" Conference paper; Presented at 13th AAAI Conference on Innovative Applications of Artificial Intelligence (IAAI-18); 6 pages.

Valeur et al.; "A Comprehensive Approach to Intrusion Detection Alert Correlation"; white paper; Published in: IEEE Transaction on Dependable and Secure Computing; vol. 1, No. 3, Jul.-Sep. 2004; 23 pages.

Vasilonanolakis et al.; "Taxonomy and Survey of Collaborative Intrusion Detection"; white paper; Published in: ACM Comput. Surv. 47, 4, Article 55; May 2015, 33 pages.

Vervier et al.; "Mind Your Blocks: On the Stealthiness of Malicious BGP Hijacks"; Conference paper; NDSS'15, San Diego, CA; Feb. 8-11, 2015; 15 pages.

Xu et al.; "Neural Network-based Graph Embedding for Cross-Platform Binary Code Similarity Detection"; Conference paper; Presented at: ACM CCS 2017, Dallas, TX; Oct. 30-Nov. 3, 2017.

Yao et al.; "DynamicWord Embedding for Evolving Semantic Discovery" Conference paper; Presented at: WSDM 2018, Marina Del Rey, CA; Feb. 5-9, 2018 9 pages.

Kannadiga et al.; "DIDMA: A Distributed Intrusion Detection System Using Mobile Agents"; Conference paper; Presented at Proceedings of the Sixth International Conference on Software Engineering, Artificial Intelligence, Networking and Parallel/Distributed Computing and First ACIS International Workshop on Self-Assembling Wireless Networks (SNPD/SAWN'05); May 23-25, 2005; 8 pages.

\* cited by examiner

IDENTIFYING AND PROTECTING AGAINST EVOLVING CYBERATTACKS USING TEMPORAL WORD EMBEDDINGS

BACKGROUND

Modern cyberattacks are increasingly complex and generally involve a number of attack steps. For example, a cyberattack that is trying to access and exploit an endpoint computer system may perform a number of attack steps to achieve its goal. These attack steps may include reconnaissance (e.g., identifying weaknesses on the endpoint), the actual exploitation, and installing mechanisms to ensure persistence (e.g., installing a Remote Access Trojan (RAT) on the endpoint). Moreover, gaining unauthorized access to the endpoint might not be enough for a cyberattack to achieve its objective, and therefore the cyberattack may perform additional attack steps after gaining unauthorized access to the endpoint (e.g., exploiting another vulnerability to escalate privileges). Additionally, for each of the attack steps that make up a cyberattack, a variety of malicious actions may be executed (e.g., exploiting different known vulnerabilities on the endpoint), depending on the exploits that are available, on the software configuration of the endpoint, and on its security hygiene (e.g., based on known vulnerabilities that have not yet been patched).

Identifying and protecting against cyberattacks can be difficult due to the fact that attackers tend to evolve cyberattacks over time. An attacker may evolve a cyberattack for a variety of reasons including defenses being deployed that render the cyberattack ineffective (e.g., when a vulnerability gets patched), the attacker developing a more efficient strategy for the cyberattack, or the attacker hoping to avoid detection of the cyberattack. The evolution of cyberattacks can make the cyberattacks difficult to identify and protect against, resulting in costly unauthorized access and exploitation of endpoints.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and protecting against evolving cyberattacks using temporal word embeddings may be at least partially performed by a computer device including one or more processors. The method may include identifying sequences of security events that occurred over time on endpoint devices. The method may also include embedding each of the sequences of security events into low dimensional vectors, such that each of the sequences of security events is treated as a sentence, and such that each of the security events is treated as a word in the corresponding sentence. The method may further include analyzing the low dimensional vectors to identify a first cyberattack represented by a first sequence of security events and a second cyberattack represented by a second sequence of security events that is different from the first sequence of security events, the second cyberattack being an evolved version of the first cyberattack. The method may also include, in response to identifying the second cyberattack, protecting against the second cyberattack by directing performance, at one or more of the endpoint devices, of a remedial action to protect the one or more endpoint devices from the second cyberattack.

In some embodiments, the directing performance, at the one or more endpoint devices, of the remedial action may include one or more of blocking the one or more endpoint devices from accessing a network, rolling back one or more changes at the one or more endpoint devices that were made by the second cyberattack, quarantining an application on the one or more endpoint devices, uninstalling an application from the one or more endpoint devices, or temporarily freezing activity at the one or more endpoint devices, or some combination thereof.

In some embodiments, both the first cyberattack and the second cyberattack may include a particular security event in their different sequences of security events. In these embodiments, the analyzing of the low dimensional vectors may further include analyzing a context in which the particular security event is exploited in the first cyberattack and detecting when the context changes in the second cyberattack. Also, in these embodiments, the context may change due to a vulnerability being patched rendering the first cyberattack ineffective.

In some embodiments, the analyzing of the low dimensional vectors may further include calculating a cosine similarity value as a distance metric to quantify temporal embedding changes.

In some embodiments, the embedding of each of the sequences of security events into the low dimensional vectors may include modeling relationships between the words in the sentences.

In some embodiments, one or more non-transitory computer-readable media may include one or more computer-readable instructions that, when executed by one or more processors of a computer device, cause the computer device to perform a method for identifying and protecting against evolving cyberattacks using temporal word embeddings.

In some embodiments, a computer device may include one or more processors and one or more non-transitory computer-readable media. The one or more non-transitory computer-readable media may include one or more computer-readable instructions that, when executed by the one or more processors, cause the computer device to perform a method for identifying and protecting against evolving cyberattacks using temporal word embeddings.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Modern cyberattacks are increasingly complex and generally involve a number of attack steps, each of which may be a security event. For example, a cyberattack that is trying to access and exploit an endpoint computer system may perform a number of security events to achieve its goal. Identifying and protecting against cyberattacks can be difficult due to the fact that attackers tend to evolve cyberattacks over time in order, for example, to overcome defenses that render the cyberattack ineffective, to implement a more efficient strategy for the cyberattack, or to avoid detection of the cyberattack. The evolution of cyberattacks can make the cyberattacks difficult to identify and protect against, resulting in costly unauthorized access and exploitation of endpoints.

Some embodiments disclosed herein may enable identifying and protecting against evolving cyberattacks using temporal word embeddings. In some embodiments, a security app may identify sequences of security events that occurred over time on endpoint devices. The security app may then embed each of the sequences of security events into low dimensional vectors, such that each of the sequences of security events is treated as a sentence, and such that each of the security events is treated as a word in the corresponding sentence. The security app may then analyze the low dimensional vectors to identify a first cyberattack represented by a first sequence of security events and a second cyberattack represented by a second sequence of security events that is different from the first sequence of security events and that is an evolved version of the first cyberattack. Finally, in response to identifying the second cyberattack, the security app may protect against the second cyberattack by directing performance, at one or more of the endpoint devices, of a remedial action to protect the one or more endpoint devices from the second cyberattack. Therefore, in some embodiments, the methods disclosed herein may use temporal word embeddings to identify and protect against evolving cyberattacks, thus reducing or preventing costly unauthorized access and exploitation of endpoints.

Figure 1:
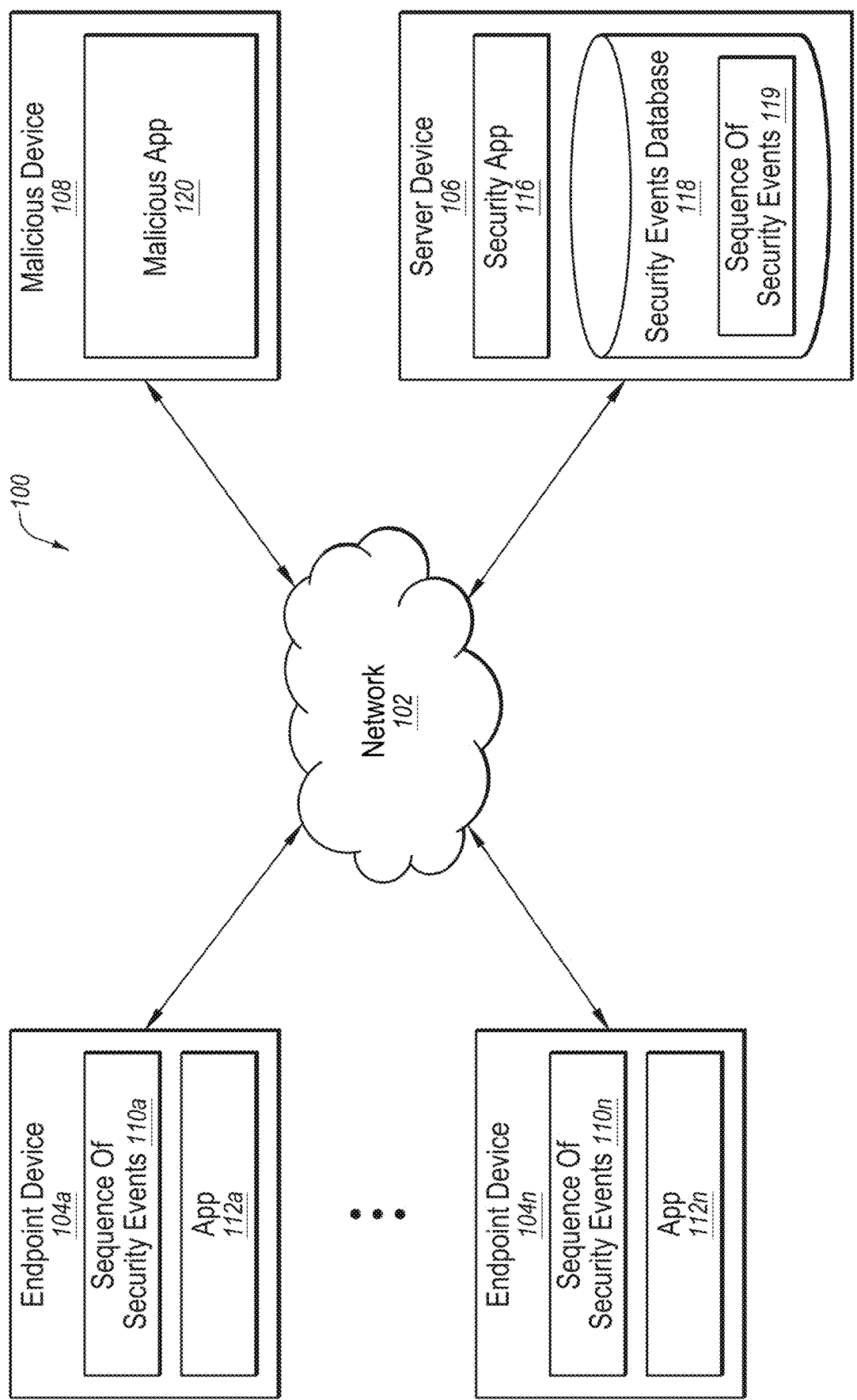
FIG. 1 illustrates an example system configured for identifying and protecting against evolving cyberattacks using temporal word embeddings.

Turning to the figures, FIG. 1 illustrates an example system 100 configured for identifying and protecting against evolving cyberattacks using temporal word embeddings. The system 100 may include a network 102, endpoint devices 104a-104n, a server device 106, and a malicious device 108.

In some embodiments, the network 102 may be configured to communicatively couple the endpoint devices 104a-104n, the server device 106, and the malicious device 108 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 5:
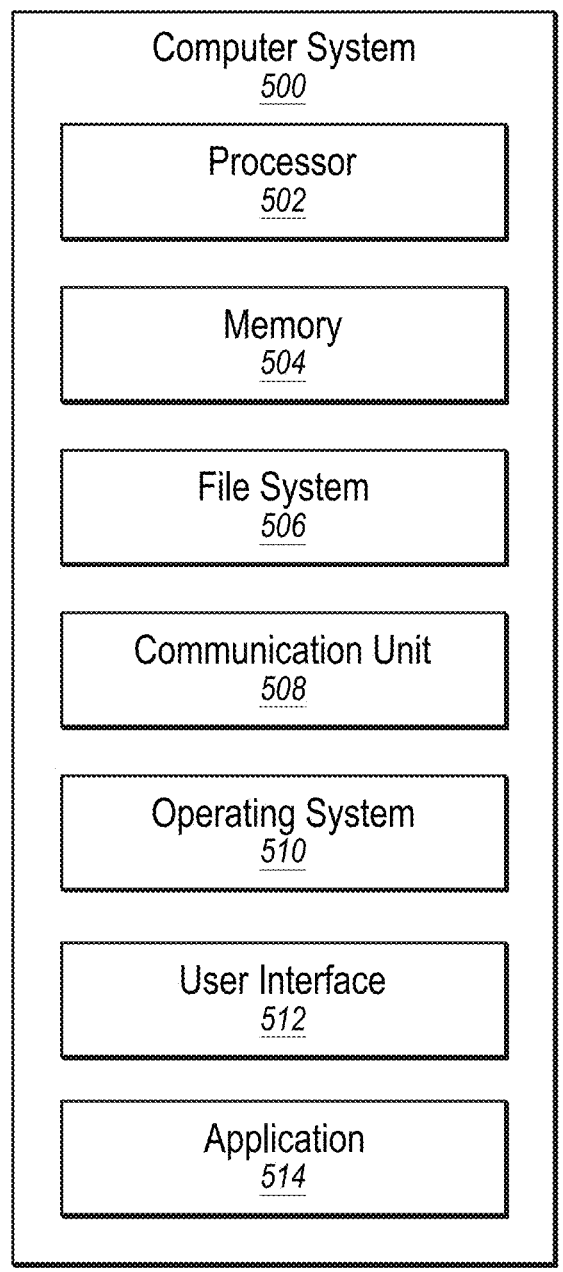
FIG. 5 illustrates an example computer system that may be employed in identifying and protecting against evolving cyberattacks using temporal word embeddings.

In some embodiments, the malicious device 108 may be any computer system capable of communicating over the network 102 and capable of executing a malicious app 120, examples of which are disclosed herein in connection with the computer system 500 of FIG. 5. The malicious app 120 may be configured to launch one or more cyberattacks against other network devices, or otherwise attack other network devices. In some embodiments, each of these cyberattacks may include a sequence of security events. Further, the malicious app 120 may be configured to evolve a cyberattack over time by changing either the order or content of the sequence of security events that make up the cyberattack.

In some embodiments, each of the endpoint devices 104a-104n may be any computer system capable of communicating over the network 102, examples of which are disclosed herein in connection with the computer system 500 of FIG. 5. The endpoint devices 104a-104n may experience sequences of security events 110a-110n. These sequences, or some sub-sequences thereof, may represent cyberattacks launched by the malicious app 120.

In some embodiments, the server device 106 may be any computer system capable of communicating over the network 102 and capable of executing a security app 116, examples of which are disclosed herein in connection with the computer system 500 of FIG. 5. The security app 116 may be configured to implement one or more actions of the methods disclosed herein.

For example, the security app 116 may be configured to identify the sequences of security events 110a-110n that occurred over time on the endpoint devices 104a-104n. These sequences of security events 110a-110n may then be stored in a security events database 118 as sequences of security events 119. The security app 116 may then embed each of the sequences of security events 119 into low dimensional vectors, such that each of the sequences of security events 110a-110n is treated as a sentence, and such that each of the security events is treated as a word in the corresponding sentence. The security app 116 may then analyze the low dimensional vectors to identify a first cyberattack represented by a first sequence of security events and a second cyberattack represented by a second sequence of security events that is different from the first sequence of security events and that is an evolved version of the first cyberattack. Finally, in response to identifying the second cyberattack, the security app 116 may protect against the second cyberattack by directing performance, at one or more of the endpoint devices 104a-104n, of a remedial action to protect the one or more endpoint devices from the second cyberattack. Therefore, in some embodiments, the security app 116 may use temporal word embeddings to identify and protect against evolving cyberattacks, thus reducing or preventing costly unauthorized access and exploitation of the endpoint devices 104a-104n.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
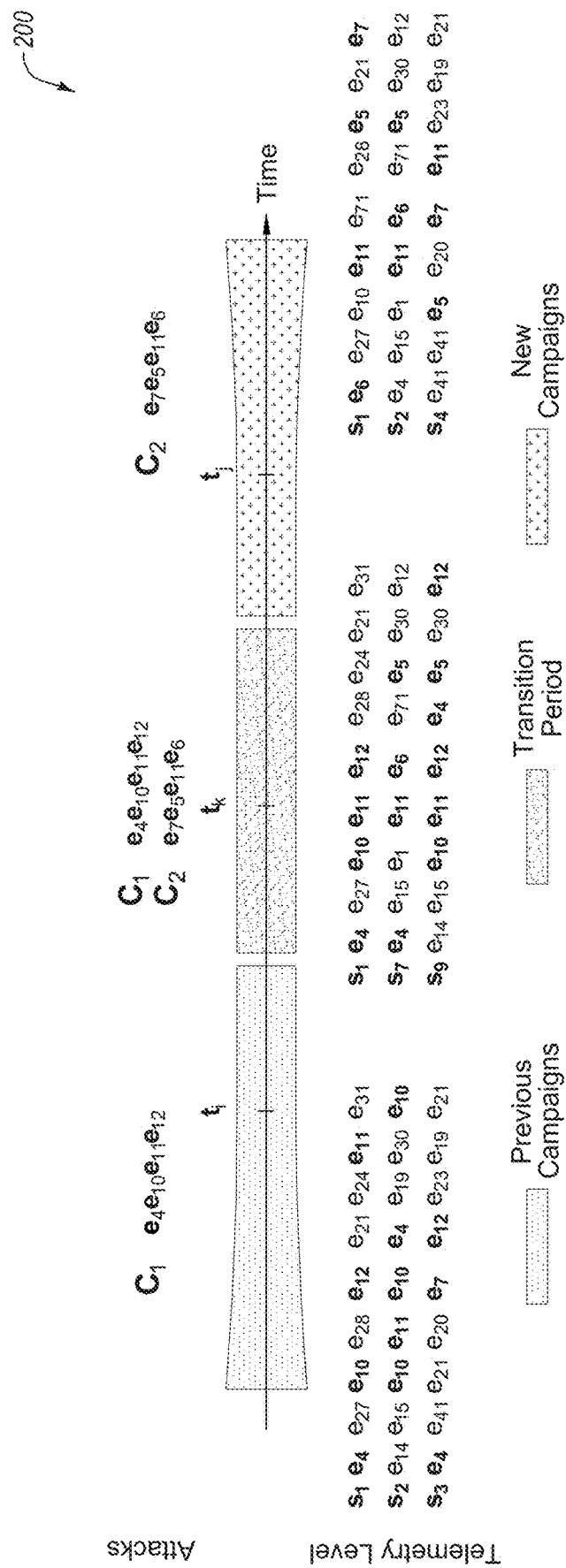
FIG. 2 is a flowchart illustrating aspects of the evolution of a first cyberattack into a second cyberattack.

FIG. 2 is a flowchart 200 illustrating aspects of the evolution of a first cyberattack $C_1$ into a second cyberattack $C_2$. In particular, the flowchart 200 discloses telemetry data from several endpoints (namely, endpoints $s_1$, $s_2$, $s_3$, $s_4$, $s_7$, and $s_9$) undergoing two coordinated cyberattacks (namely, the first cyberattack $C_1$ into a second cyberattack $C_2$) over time, each made up of multiple security events.

Both the first cyberattack $C_1$ (e.g., during the previous campaigns) and the second cyberattack $C_2$ (e.g., during the new campaigns) leverage the security event (e.g., attack step) $e_{11}$, which in this example may be the security event "CVE-2018-7602 Drupal core RCE." The first cyberattack $C_1$ may be expressed as $C_1$: $\{e_4, e_{10}, e_{11}, e_{12}\}$, may mainly function as a reconnaissance cyberattack, and may include the security event "Joomla JCE security bypass and XSS vulnerabilities" ($e_4$), the security event "Wordpress RevSlider/ShowBiz security byPass" ($e_{10}$) the security event "Symposium plugin shell upload" ($e_{12}$), and the security event $e_{11}$. The second cyberattack $C_2$ may be expressed as $C_2$: $\{e_7, e_5, e_{11}, e_6\}$, may be a cyberattack targeted at the Drupal ecosystem, and may include the security event "phpMyAdmin RFI CVE-2018-12613" ($e_7$), the security event "Drupal SQL Injection CVE-2014-3704" ($e_5$), the security event "Apache Flex BlazeDS RCE CVE-2017-3066" ($e_6$), and the security event $e_{11}$.

In some embodiments, the context in which the security event $e_{11}$ is exploited may be automatically analyzed in order to identify changing trends. One challenge with this analysis may include the observation that even though endpoints at a certain timestamp are going through the same type of cyberattack (e.g., the cyberattack $C_1$ at timestamp $t_1$), there may be no apparent event relationships reflected in the telemetry data due to noise (e.g., other security events not related to the coordinated cyberattacks $C_1$ and $C_2$, or certain events relating to the coordinated cyberattacks $C_1$ and $C_2$ being not observed). By simply analyzing the telemetry data recorded at timestamp $t_1$, it is not trivial to understand how the security event $e_{11}$ is leveraged by the attackers by directly inspecting the security events or what attack vectors are used together with $e_{11}$, etc. Additionally, not all security events may be observed in a given observation period. For example, the security event $e_7$ is not observed until the timestamp $t_j$. Another challenge with this analysis may include the evolution of a cyberattack over time, which may cause the context of a security event and its relationship with other cyberattack security events to drift. For example, it may be possible for the cyberattacks $C_1$ and $C_2$ to be operated by the same attacker, and that at some point the attacker changed their attack scripts to leverage newly disclosed vulnerabilities (e.g., the security event "phpMyAdmin RFI CVE-2018-12613" ($e_7$)). As disclosed in FIG. 1, from the timestamp $t_i$ to the timestamp $t_j$, the cyberattack $C_1$ gradually evolved into (e.g., migrated to or was replaced by) the cyberattack $C_2$. However, it may be difficult to determine if these new relationships (e.g., the security event $e_{11}$ starting to appear in close proximity of the security event $e_5$) at the timestamp $t_k$ with respect to the relationships of the timestamp $t_i$ are due to noise or are actually indicators of a change in the way that the security event $e_{11}$ is being employed in a cyberattack. Considering all these temporal factors, some embodiments disclosed herein employ a model that is able to understand the context of a security event and its changes over time, and whose output can be quantitatively measured and studied.

Figure 3:
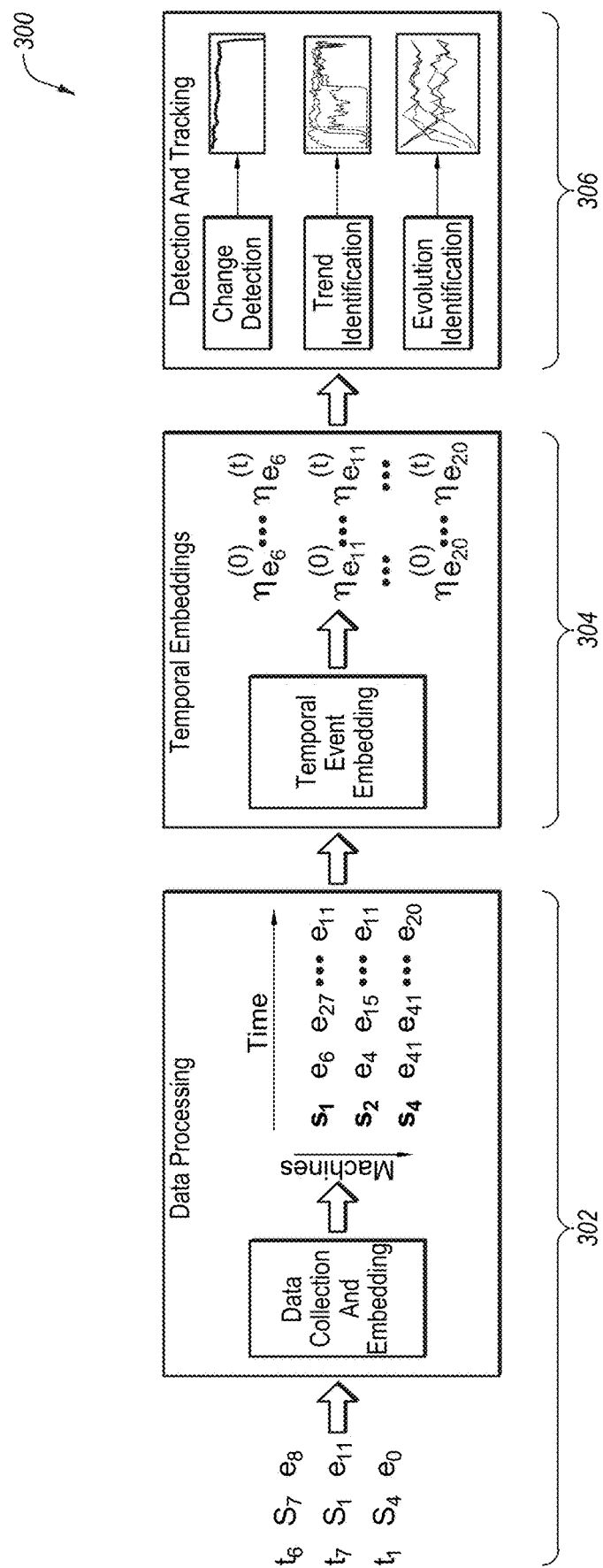
FIG. 3 is a flowchart illustrating aspects of phases employed to identify and protect against evolving cyberattacks using temporal word embeddings.

FIG. 3 is a flowchart 300 illustrating aspects of phases employed to identify and protect against evolving cyberattacks using temporal word embeddings. As disclosed in the flowchart 300, multiple phases 302-306 may be employed by a security app (e.g., the security app 116 of FIG. 1) to identify and protect against evolving cyberattacks using temporal word embeddings.

In a data collection and preprocessing phase 302, the security app may identify sequences of security events that occurred over time on endpoint devices (e.g., the endpoint devices 104a-104n). A security event $e_i \in \varepsilon$ may be a time-stamped observation recorded at timestamp i, where $\varepsilon$ denotes the set of all unique events and $|\varepsilon|$ denotes the size of $\varepsilon$. A security event sequence observed in an endpoint device $s_j$ may be a sequence of events ordered by their observation time, $s_j = \{e_1^{(j)}, e_2^{(j)}, \ldots, e_t^{(j)}\}$. For example, let $S_t = \{s^t_1, \ldots, s^t_i, \ldots, s^t_z\}$ denote the set of the security events from z endpoints during the t-th observation period, and let $S = \{S_1, \ldots, S_t, \ldots, S_T\}$, $t=1, \ldots, T$, denote the total security events over time T. It is noted that not all security events may be observed in a given $S_t$. For example, security events associated with Common Vulnerabilities and Exposures (CVEs) reported in 2018 may not present in the set of security events collected in 2017. Some embodiments may find a mapping function $M(e_i, S, T) \rightarrow \{n_{e_i}^t\}$, where $t=1, \ldots, T$ and $n_{e_i}^t \in \mathbb{R}^d$, $d \ll |\varepsilon|$ denotes a d-dimensional vector representation of the security event $e_i$ is at timestamp t. As a proxy for security events (e.g., attack steps) used by attackers, some embodiments may employ security event data collected from endpoint devices, such as security event data collected from Symantec's Intrusion Prevention System (IPS), in which meta-information associated with a security event is recorded when network-level or system-level activity is detected that matches a predefined signature (e.g., a security event). However, these embodiments disclosed herein could be applied to other datasets with similar characteristics. During the data collection and preprocessing phase 302, the security app may reconstruct the security events observed on a given endpoint device $s_1$ as a sequence of events ordered by timestamps, in the format of $s_j = \{e_1^{(j)}, e_2^{(j)}, \ldots, e_t^{(j)}\}$. The output of the data collection and preprocessing phase 302 may then be $S_t = \{s^t_1, \ldots, s^t_i, \ldots, s^t_z\}$, where z denotes the number of endpoint devices.

Then, in a temporal event embedding phase 304, the security app may then embed each of the sequences of security events into low dimensional vectors, such that each of the sequences of security events is treated as a sentence, and such that each of the security events is treated as a word in the corresponding sentence. This embedding may employ pointwise mutual information (PMI), which is a measure for word associations, to calculate weights between two security events given a contextual window c and an observation period t.

In some embodiments, different attack vectors are often packed together by attackers for a given period of time. For example, silent delivery campaigns may exhibit synchronized activity among a group of downloaders or domains and access the same set of domains to retrieve payloads within a short bounded time period. Further, some machines may potentially observe different attacks from various adversary groups happening at the same time, and one coordinated attack may be observed by different machines. On the defense side, related security events may co-occur within a context (e.g., the sequence of attack steps that are commonly performed together with an attack step of interest). Note that this context can be defined as a time window or a rollback window. In some embodiments, the context may be defined as a sliding window, denoted as c, centering around a given security event $e_i$. The purpose of using a symmetric context window may be to deal with the noise incurred by concurrency at the telemetry level. For example, with reference again to FIG. 2, and given a real-world coordinated cyberattack $C_2$: $\{e_7, e_5, e_{11}, e_6\}$, each endpoint may observe the attack vectors in different order (e.g., $e_7$ and $e_5$ may switch orders), attack vectors might be diluted by other unrelated security events (e.g., $e_{71}$ is observed between $e_6$ and $e_5$ in $s_2$), or certain security events may not be observed, for example because they have been blocked by other security products before the IPS was able to log them (e.g., $e_6$ not observed in $s_4$). The context window mechanism may be able to capture the events surrounding a given security event (i.e., before and after), thus minimizing the impact of noise incurred by concurrency.

PMI may measure the extent to which the events co-occur more than by chance or are independent. The assumption may be that if two events co-occur more than expected under independence there must be some kind of relationship between them. For each t-th observation period, we may build a $|\varepsilon| \times |\varepsilon|$ PMI matrix, where a PMI value between $e_i$ and $e_j$ may be defined as follows:

$$PMI_t(e_i, e_j, c, S) = \max\left(\log\left(\frac{p_t(e_i, e_j)}{p_t(e_i)p(e_j)}\right), 0\right),$$

$$p_t(e_i, e_j) = \frac{W(e_i, e_j)}{|S_t|},$$

$$p_t(e_i) = \frac{W(e_i)}{|S_t|},$$

where $W(e_i)$ and $W(e_j)$ respectively count the occurrences of security events $e_i$ and $e_j$ in $S_t$, and $W(e_i, e_j)$ counts the number of times $e_i$ and $e_j$ co-occur within a context window in $S_t$. Note that when $W(e_i, e_j)$, the number of times that $e_i$ and $e_j$ co-occur in a given contextual window may be small, log $$\left(\frac{p_t(e_i, e_j)}{p_t(e_i)p(e_j)}\right)$$

can be negative and can affect the numerical stability. Therefore, only the positive values may be kept in the equations above.

Following the definition of $PMI_t$, the security event embedding $H(t)$, e.g., $n_{e_i}^t \in H(t)$, at t-th observation time may be defined as a factorization of $PMI_t(c,S)$, as follows:

$$H(t)H(t)^T \approx PMI_t(c,S).$$

The denser representation $H(t)$ may reduce the noise and may be able to capture events with high-order co-occurrence (e.g., that appear in similar contexts). These characteristics may enable some embodiments to use word embedding techniques to encode latent forms of security events, and interpret the security event evolution in a meaningful and measurable way.

Across time T, in some embodiments $n_{e_i}^t \approx n_{e_i}^{t+1}$, which means that the same security event may be placed in the same latent space so that their changes across time can be reliably studied. This requirement may be rooted in a practical implication. For example, a security event may be observed after its associated CVE was disclosed. Its embeddings may therefore approximately stay the same before the disclosure date. Otherwise, unwanted embedding changes may be observed and invalidate the findings. To this end, one solution is the following joint optimization problem as the temporal embedding results. In the following equations, $\|\bullet\|$ denotes squared Frobenius norm of a vector.

$$\min_{H(1),\ldots,H(T)} \frac{1}{2} \sum_{t=1}^{T} \|PMI_t(c, S) - H(t)H(t)^T\|_2 +$$

$$\frac{\alpha}{2} \sum_{t=1}^{T} \|H(t)\|^2 + \frac{\beta}{2} \sum_{t=1}^{T} \|H(t-1) - H(t)\|^2,$$

where $\alpha$ and $\beta$ are parameters respectively regularizing $H(t)$, and making sure that $H(t-1)$ and $H(t)$ are aligned (e.g., embeddings should be close if their associated contexts do not change between subsequent times). In this way, all embeddings across time T may be taken into consideration. At the same time, this method can accommodate extreme cases such as the one in which security event $e_i$ is not observed in $(S)_t$ since the optimization is applied across all time slices in the preceding equation. In some embodiments, a grid search used to identify parameters may set $\alpha=10$, $\beta=40$, c=8, and d=50 and run 5 epochs for all the evaluations.

During the temporal event embedding phase 304, security events may be embedded into a low dimensional space over time. The temporal event embedding phase 304 may take S as input and encode latent forms of security events, by considering sequences of security events in the IPS logs as short sentences and phrases in a special language. In this way, each security event, at a timestamp t, may be represented by a d-dimensional vector representation $n_{e_i}^t$, and later aligned across time.

Then, in an event tracking and monitoring phase 306, the security app may analyze the low dimensional vectors to identify a first cyberattack represented by a first sequence of security events and a second cyberattack represented by a second sequence of security events that is different from the first sequence of security events and that is an evolved version of the first cyberattack. For example, during the event tracking and monitoring phase 306, various metrics may be used to detect changes, identify event trends, and monitor how security events are exploited in a measurable and quantifiable way.

With respect to using various metrics to detect changes, in some embodiments, a cosine similarity may be used as the distance metric to quantify the temporal embedding changes at time t in the latent space. For example, for any two embeddings (e.g., $n_{e_i}^{(t)}$ and $n_{e_j}^{(t)}$), the similarity may be measured according to the following equation:

$$\text{similarity}(n_{e_i}^{(t)}, n_{e_j}^{(t)}) = \frac{n_{e_i}^{(t)T} n_{e_j}^{(t)}}{\|n_{e_i}^{(t)}\|_2 \|n_{e_j}^{(t)}\|_2}$$

The cosine similarity may be used in positive space, where the outcome is bounded in [0, 1]. For example, two vectors with the same orientation may have a cosine similarity of 1 (most similar), while two vectors oriented at 90 degrees relative to each other may have a cosine similarity of 0 (not similar). In the following equation, the neighborhood of a security event embedding $e_i^{(t)}$ is denoted as $N(e_i^{(t)})$, and accordingly defined as:

$$N(e_i^{(t)}) = \text{argsort}_{e_i^{(t)}}(\text{similarity}(e_i^{(t)}, e_j^{(t)})).$$

$N(e_i^{(t)})$ may enable the use of temporal embeddings to discover and analyze how different security events are used together with $e_i$. $N_k(e_i^{(t)})$ may be used to denote the top k closest neighbors of $e_i$. This may be used to identify security events that are frequently used together as part of a multi-step attack. A weighted drift metric may also be used to measure a security event relative changes. This metric may be defines as follows:

$$\text{weighted\_drift}(e_i) = \arg sort_i \left( \frac{\|n_{e_i}^{(t-1)}, n_{e_i}^{(t)}\|}{\sum_{e \in \varepsilon} \|n_e^{(t-1)}, n_e^{(t)}\|} \right)$$

The foregoing equation normalizes a security event's embedding change by the sum of all security event changes within that observation period. This metric may enable the measurement of how a security event changes compared to the other security events within a given observation point.

With respect to detecting changes, one practical consideration when evaluating the temporal security event embeddings is determining the fidelity of the embedding results over time. As used herein, fidelity may refer to the condition that the same security event should be placed in the same latent space. For example, if the frequency and the contexts of a security event between subsequent time slices do not change, its latent embedding should stay the same. This consistency allows the change to be reliably detected. This requirement lays the foundation to quantitatively study their changes. The concept of fidelity may be different from the stability term used in previous research approaches in which stability was used to evaluate how classifiers perform after certain periods of time. Bearing this difference in mind, the following two criteria may be used to evaluate the fidelity of temporal embeddings and show how some embodiments can faithfully capture both single event usage change and global changes:

criterion a—The cosine similarity of the event embeddings should be stable when an event usage does not change between subsequent time slices.
 criterion b—The cosine similarity of these embeddings should change swiftly if these events are used in different attacks or emerge as a new attack vector.

With respect to trend identification, word embeddings calculated as disclosed herein may be more robust than the convention calculation of temporal frequencies to reveal trend changes.

With respect to event evolution, another useful functionality for which some embodiments can be used is understanding how attacks evolve in the wild, and in particular monitoring which attack steps are often performed together by attackers. For example, security events that are often used together may have similar contexts. Identifying events with such similar contexts could help detecting emerging threats such as new botnets scanning for specific vulnerabilities (e.g., Mirai or WannaCry) or new exploit kits that are probing for specific weaknesses in victim systems.

Later, in response to identifying the second cyberattack, the security app may protect against the second cyberattack by directing performance, at one or more of the endpoint devices, of a remedial action to protect the one or more endpoint devices from the second cyberattack. Therefore, as disclosed herein, the phases of the flowchart 200 may use temporal word embeddings to identify and protect against evolving cyberattacks, thus reducing or preventing costly unauthorized access and exploitation of endpoints.

Modifications, additions, or omissions may be made to the flowcharts 200 and 300 of FIGS. 2 and 3 without departing from the scope of the present disclosure. In some embodiments, the flowcharts 200 and 300 may include additional components similar to the components illustrated in FIGS. 2 and 3 that each may be configured similarly to the components illustrated in FIGS. 2 and 3.

Figure 4:
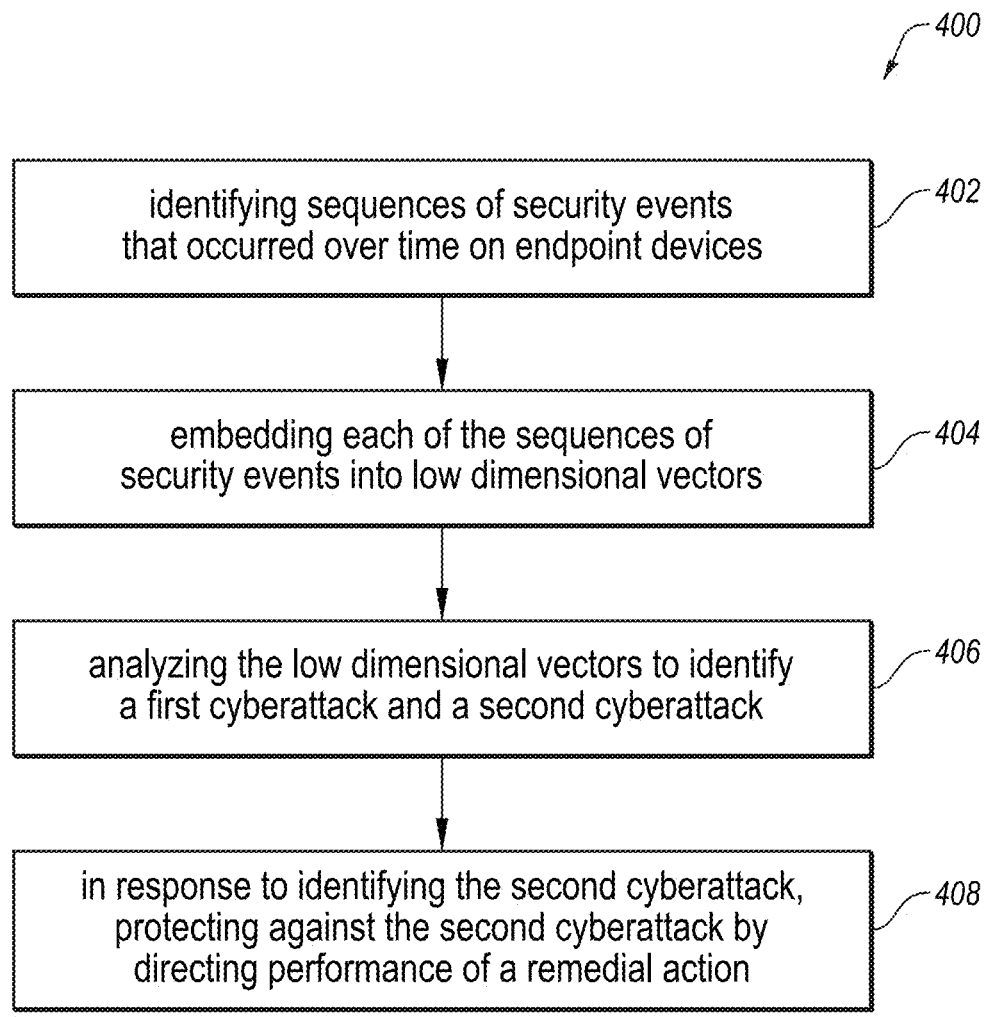
FIG. 4 is a flowchart of an example method for identifying and protecting against evolving cyberattacks using temporal word embeddings.

FIG. 4 is a flowchart of an example method 400 for identifying and protecting against evolving cyberattacks using temporal word embeddings. The method 400 may be performed, in some embodiments, by one or more applications, devices, or systems, such as by the security app 116 of FIG. 1, or some other app(s) or application(s), or some combination thereof. In these and other embodiments, the method 400 may be performed by one or more processors based on one or more computer-readable instructions stored on one or more non-transitory computer-readable media. The method 400 will now be described in connection with FIGS. 1, 2, 3, and 4.

The method 400 may include, at action 402, identifying sequences of security events that occurred over time on endpoint devices. For example, the security app 116 may identify, at action 402, the sequences of security events 110a-110n that occurred over time at the endpoint devices 104a-104n.

The method 400 may include, at action 404, embedding each of the sequences of security events into low dimensional vectors. In some embodiments, the embedding at action 404 may include each of the sequences of security events being treated as a sentence, and each of the security events being treated as a word in the corresponding sentence. In some embodiments, the embedding of each of the sequences of security events into the low dimensional vectors may include modeling relationships between the words in the sentences. For example, the security app 116 may embed, at action 404, each of the sequences of security events 110a-110n or 119 into low dimensional vectors, with each of the sequences of security events 110a-110n or 119 being treated as a sentence, and each of the security events being treated as a word in the corresponding sentence, such that relationships between the words in the sentences are modeled.

The method 400 may include, at action 406, analyzing the low dimensional vectors to identify a first cyberattack and a second cyberattack. In some embodiments, the first cyberattack may be represented by a first sequence of security events, and the second cyberattack may be represented by a second sequence of security events that is different from the first sequence of security events. In some embodiments, the second cyberattack may be an evolved version of the first cyberattack. In some embodiments, the analyzing of the low dimensional vectors at action 406 may further include calculating a cosine similarity value as a distance metric to quantify temporal embedding changes. For example, the security app 116 may analyze, at action 406, the low dimensional vectors to identify the first cyberattack $C_1$ and the second cyberattack $C_2$. In this example, the first cyberattack $C_1$ is an evolved version of the second cyberattack $C_2$, with the first cyberattack $C_1$ being represented by a first sequence of security events (e.g., $C_1$: $\{e_4, e_{10}, e_{11}, e_{12}\}$), and the second cyberattack $C_2$ being represented by a second sequence of security events (e.g., $C_2$: $\{e_7, e_5, e_{11}, e_6\}$) that is different from the first sequence of security events. This analyzing may include calculating a cosine similarity value as a distance metric to quantify temporal embedding changes.

In some embodiments, both the first cyberattack and the second cyberattack identified at action 406 may include a particular security event in their different sequences of security events. In these embodiments, the analyzing of the low dimensional vectors may further include analyzing a context in which the particular security event is exploited in the first cyberattack and detecting when the context changes in the second cyberattack. Also, in these embodiments, the context may change due to a vulnerability being patched rendering the first cyberattack ineffective. For example, the first cyberattack $C_1$ and the second cyberattack $C_2$ may include the particular security event $e_{11}$ in their different sequences of security events, and the context in which the particular security event $e_{11}$ is exploited in the first cyberattack $C_1$ may be analyzed in order to detect when the context changes in the second cyberattack $C_2$ due to, for example, a vulnerability being patched rendering the first cyberattack $C_1$ ineffective.

The method 400 may include, at action 408, in response to identifying the second cyberattack, protecting against the second cyberattack by directing performance of a remedial action. In some embodiments, the action 408 may include directing performance, at one or more of the endpoint devices, of a remedial action to protect the one or more endpoint devices from the second cyberattack. In some embodiments, the directing performance, at the one or more endpoint devices, of the remedial action may include one or more of blocking the one or more endpoint devices from accessing a network, rolling back one or more changes at the one or more endpoint devices that were made by the second cyberattack, quarantining an application on the one or more endpoint devices, uninstalling an application from the one or more endpoint devices, or temporarily freezing activity at the one or more endpoint devices, or some combination thereof. For example, in response to identifying the second cyberattack $C_2$, the security app 116 may direct performance, at action 408, of a remedial action to protect one or more of the endpoint devices 104a-104n from the second cyberattack $C_2$. In this example, the remedial action may include one or more of blocking the one or more endpoint devices 104a-104n from accessing the network 102, rolling back one or more changes at the one or more endpoint devices 104a-104n that were made by the second cyberattack $C_2$, quarantining one of the apps 112a-112n on the one or more endpoint devices 104a-104n, uninstalling one of the apps 112a-112n from the one or more endpoint devices 104a-104n, or temporarily freezing activity at the one or more endpoint devices 104a-104n, or some combination thereof.

Although the actions of the method 400 are illustrated in FIG. 4 as discrete actions, various actions may be divided into additional actions, combined into fewer actions, reordered, expanded, or eliminated, depending on the desired implementation. For example, in some embodiments, actions 402-406 may be performed without performing action 408 of the method 400. Further, in some embodiments, action 408 may be performed by a network administrator or other entity that is different from the entity or entities performing the other actions of the method 400.

Further, it is understood that the method 400 may improve the functioning of an endpoint device itself, and may improve the technical field of cyberattack identification and remediation. For example, the functioning of the endpoint devices 104a-104n may themselves be improved by the method 400, by identifying and protecting against cyberattacks launched against the endpoint devices 104a-104n. This identification may be more accurate than was possible using conventional methods due to the identification more accurately detecting any evolution of a cyberattack over time. This more accurate identification of cyberattacks launched against the endpoint devices 104a-104n can enable remedial actions to be taken to protect these endpoint devices 104a-104n, and their users, from attackers being able to access and exploit these endpoint devices 104a-104n.

FIG. 5 illustrates an example computer system 500 that may be employed in identifying and protecting against evolving cyberattacks using temporal word embeddings. In some embodiments, the computer system 500 may be part of any of the systems or devices described in this disclosure. For example, the computer system 500 may be part of any of the endpoint devices 104a-104n, the server device 106, or the malicious device 108 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more actions of the method 400 of FIG. 4.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more actions of the method 400 of FIG. 4. These computer-executable instructions may be included, for example, in the operating system 510, in one or more applications, such as in any of the apps 112a-112n, the security app 116, or the malicious app 120 of FIG. 1, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more actions of the method 400 of FIG. 4. In some embodiments, the application 514 (e.g., app) may be part of the operating system 510 or may be part of an application of the computer system 500, or may be some combination thereof. In some embodiments, the application 514 may function as any of the apps 112a-112n, the security app 116, or the malicious app 120 of FIG. 1.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against evolving cyberattacks using temporal word embeddings, at least a portion of the method being performed by a computer device comprising one or more processors, the method comprising:
   identifying sequences of security events that occurred over time on endpoint devices;
   embedding each of the sequences of security events into low dimensional vectors, such that each of the sequences of security events is treated as a sentence, and such that each of the security events is treated as a word in the corresponding sentence;
   analyzing the low dimensional vectors to identify a first cyberattack represented by a first sequence of security events and a second cyberattack represented by a second sequence of security events that is different from the first sequence of security events, the second cyberattack being an evolved version of the first cyberattack; and
   in response to identifying the second cyberattack, protecting against the second cyberattack by directing performance, at one or more of the endpoint devices, of a remedial action to protect the one or more endpoint devices from the second cyberattack.

2. The method of claim 1, wherein the directing performance, at the one or more endpoint devices, of the remedial action comprises one or more of blocking the one or more endpoint devices from accessing a network, rolling back one or more changes at the one or more endpoint devices that were made by the second cyberattack, quarantining an application on the one or more endpoint devices, uninstalling the application from the one or more endpoint devices, or temporarily freezing activity at the one or more endpoint devices, or some combination thereof.

3. The method of claim 1, wherein both the first cyberattack and the second cyberattack include a particular security event in their different sequences of security events.

4. The method of claim 3, wherein the analyzing of the low dimensional vectors further comprises analyzing a context in which the particular security event is exploited in the first cyberattack and detecting when the context changes in the second cyberattack.

5. The method of claim 4, wherein the context changes due to a vulnerability being patched rendering the first cyberattack ineffective.

6. The method of claim 1, wherein the analyzing of the low dimensional vectors further comprises calculating a cosine similarity value as a distance metric to quantify temporal embedding changes.

7. The method of claim 1, wherein the embedding of each of the sequences of security events into the low dimensional vectors comprises modeling relationships between the words in the sentences.

8. One or more non-transitory computer-readable media comprising one or more computer-readable instructions that, when executed by one or more processors of a computer device, cause the computer device to perform a method for identifying and protecting against evolving cyberattacks using temporal word embeddings, the method comprising:
   identifying sequences of security events that occurred over time on endpoint devices;
   embedding each of the sequences of security events into low dimensional vectors, such that each of the sequences of security events is treated as a sentence, and such that each of the security events is treated as a word in the corresponding sentence;
   analyzing the low dimensional vectors to identify a first cyberattack represented by a first sequence of security events and a second cyberattack represented by a second sequence of security events that is different from the first sequence of security events, the second cyberattack being an evolved version of the first cyberattack; and
   in response to identifying the second cyberattack, protecting against the second cyberattack by directing performance, at one or more of the endpoint devices, of a remedial action to protect the one or more endpoint devices from the second cyberattack.

9. The one or more non-transitory computer-readable media of claim 8, wherein the directing performance, at the one or more endpoint devices, of the remedial action comprises one or more of blocking the one or more endpoint devices from accessing a network, rolling back one or more changes at the one or more endpoint devices that were made by the second cyberattack, quarantining an application on the one or more endpoint devices, uninstalling the application from the one or more endpoint devices, or temporarily freezing activity at the one or more endpoint devices, or some combination thereof.

10. The one or more non-transitory computer-readable media of claim 8, wherein both the first cyberattack and the second cyberattack include a particular security event in their different sequences of security events.

11. The one or more non-transitory computer-readable media of claim 10, wherein the analyzing of the low dimensional vectors further comprises analyzing a context in which the particular security event is exploited in the first cyberattack and detecting when the context changes in the second cyberattack.

12. The one or more non-transitory computer-readable media of claim 11, wherein the context changes due to a vulnerability being patched rendering the first cyberattack ineffective.

13. The one or more non-transitory computer-readable media of claim 8, wherein the analyzing of the low dimensional vectors further comprises calculating a cosine similarity value as a distance metric to quantify temporal embedding changes.

14. The one or more non-transitory computer-readable media of claim 8, wherein the embedding of each of the sequences of security events into the low dimensional vectors comprises modeling relationships between the words in the sentences.

15. A computer device comprising:
one or more processors; and
one or more non-transitory computer-readable media comprising one or more computer-readable instructions that, when executed by the one or more processors, cause the computer device to perform a method for identifying and protecting against evolving cyberattacks using temporal word embeddings, the method comprising:
identifying sequences of security events that occurred over time on endpoint devices;
embedding each of the sequences of security events into low dimensional vectors, such that each of the sequences of security events is treated as a sentence, and such that each of the security events is treated as a word in the corresponding sentence;
analyzing the low dimensional vectors to identify a first cyberattack represented by a first sequence of security events and a second cyberattack represented by a second sequence of security events that is different from the first sequence of security events, the second cyberattack being an evolved version of the first cyberattack; and
in response to identifying the second cyberattack, protecting against the second cyberattack by directing performance, at one or more of the endpoint devices, of a remedial action to protect the one or more endpoint devices from the second cyberattack.

16. The computer device of claim 15, wherein the directing performance, at the one or more endpoint devices, of the remedial action comprises one or more of blocking the one or more endpoint devices from accessing a network, rolling back one or more changes at the one or more endpoint devices that were made by the second cyberattack, quarantining an application on the one or more endpoint devices, uninstalling the application from the one or more endpoint devices, or temporarily freezing activity at the one or more endpoint devices, or some combination thereof.

17. The computer device of claim 15, wherein both the first cyberattack and the second cyberattack include a particular security event in their different sequences of security events.

18. The computer device of claim 17, wherein:
the analyzing of the low dimensional vectors further comprises analyzing a context in which the particular security event is exploited in the first cyberattack and detecting when the context changes in the second cyberattack; and
the context changes due to a vulnerability being patched rendering the first cyberattack ineffective.

19. The computer device of claim 15, wherein the analyzing of the low dimensional vectors further comprises calculating a cosine similarity value as a distance metric to quantify temporal embedding changes.

20. The computer device of claim 15, wherein the embedding of each of the sequences of security events into the low dimensional vectors comprises modeling relationships between the words in the sentences.

\* \* \* \* \*